United States Patent [19]

Miyazaki et al.

[11] Patent Number: 4,935,039

[45] Date of Patent: Jun. 19, 1990

[54] ABRASIVE COMPOSITION AND PROCESS FOR POLISHING PLASTIC ARTICLE

[75] Inventors: Kunihiro Miyazaki; Fumio Imai, both of Shiojiri; Yoshinobu Yamaguchi, Nagoya, all of Japan

[73] Assignees: Showa Denko Kabushiki Kaisha, Tokyo; Yamaguchi Seiken Kogyo Kabushiki Kaisha, Aichi, both of Japan

[21] Appl. No.: 337,813

[22] Filed: Apr. 14, 1989

[30] Foreign Application Priority Data

Jul. 1, 1988 [JP] Japan ................................ 63-165750

[51] Int. Cl.⁵ ............................................. B24D 3/00
[52] U.S. Cl. ....................................... 51/309; 51/293; 51/303; 106/3
[58] Field of Search ......................... 51/293, 309, 303; 106/3

[56] References Cited

U.S. PATENT DOCUMENTS

| | | | |
|---|---|---|---|
| 4,631,072 | 12/1986 | Koller | 51/309 |
| 4,645,561 | 2/1987 | Rea | 51/309 |
| 4,696,697 | 9/1987 | Kitano et al. | 51/309 |
| 4,705,566 | 11/1987 | Senda et al. | 51/309 |

FOREIGN PATENT DOCUMENTS 62-15282  1/1987  Japan .

*Primary Examiner*—A. Lionel Clingman
*Assistant Examiner*—Willie J. Thompson
*Attorney, Agent, or Firm*—Sughrue, Mion, Zinn, Macpeak & Seas

[57] ABSTRACT

An effective abrasive composition is provided for polishing a plastic article, particularly a plastic lens, to give a mirror surface thereto. This abrasive composition comprises water, an aluminous abrasive and at least one polishing accelerator selected from the group consisting of aluminum oxalate and aluminum lactate, optionally with at least one sedimentation preventing agent selected from the group consisting of crystalline cellulose and colloidal alumnia.

11 Claims, No Drawings

ABRASIVE COMPOSITION AND PROCESS FOR POLISHING PLASTIC ARTICLE

BACKGROUND OF THE INVENTION (1) Field of the Invention

The present invention relates to an abrasive composition for polishing a plastic article to very rapidly impart a high precision mirror surface and to a process for polishing a plastic article by using this abrasive composition. More particularly, the present invention relates to an abrasive composition for polishing a plastic article such as a spectacle plastic lens, a camera plastic lens or an optical plastic lens, which composition comprises water, an aluminous abrasive powder, a polishing accelerator such as an aluminum oxalate or aluminum lactate, and if necessary, a sedimentation preventing agent such as crystalline cellulose or colloidal alumina.

(2) Description of the Related Art

The abrasive composition customarily used for plastic articles is a slurry formed by mixing water, an aluminous abrasive and a polishing accelerator such as aluminum nitrate, as disclosed in Japanese Examined Patent Publication No. 53-3518, published in 1978.

Japanese Unexamined Patent Publication No. 62-15828 published on Jan. 23, 1987 discloses a weakly acidic or weakly alkaline abrasive composition comprising water, an aluminous abrasive and nickel acetate, a lithium compound such as lithium acetate or lithium sulfate, a sodium compound such as sodium sulfate or sodium acetate, or a magnesium compound such as magnesium sulfate or magnesium acetate.

The conventional abrasive composition comprising aluminum nitrate as the polishing accelerator is disadvantageous from various aspects. First, since the aluminous abrasive is likely to settle as a solid in the bottom of a vessel storing the abrasive composition or an abrasive slurry tank used at the polishing step, a long time is required to homogenize the slurry by stirring before the abrasive composition is used. Furthermore, for the same reason, agglomerates likely to causing scratching are easily formed. If it is intended to recycle the abrasive composition and use it repeatedly, to reduce running cost, the aluminous abrasive is apt to separate and settle in a polishing machine or a slurry conduit system and the concentration of the aluminous abrasive is thereby changed, with the result that a stable polishing performance can not be obtained. Second, the abrasive composition corrodes the polishing machine and surrounding equipment, and wear and tear of the machine and equipment and inclusion of rust in the abrasive composition often occur during the polishing operation. Third, the abrasive composition adheres to the skin or cloth of an operator, and is likely to cause problems such as hand skin irritation.

To reduce the proportion of the processing cost in the total running cost, the processing efficiency of the abrasive composition must be increased.

SUMMARY OF THE INVENTION

A primary object of the present invention is to solve the foregoing problems and provide an abrasive composition for polishing a plastic article, which composition has a high polishing performance and provide a good polished surface, maintains a good polishing property even if the composition is recycled and used repeatedly, and has a reduced corrosive action on a machine and a reduced toxicity to a human body.

The present inventors polished plastic lenses by using various organic acids and various aluminum compounds of organic acids together with water and an aluminous abrasive, and found that aluminum oxalate and aluminum lactate show an extremely high polishing activity.

In this abrasive composition, it was found that the aluminous abrasive is often sedimented, and preferably this sedimentation is prevented. The inventors considered that, for a sedimentation preventing agent to increase the viscosity of the composition but have no adverse influence on the polished surface, the sedimentation-preventing agent must be finer than the aluminous abrasive and be chemically inactive, and various additives were examined based on this consideration. As the result, it was found that crystalline cellulose and colloidal alumina are very effective as the sedimentation preventing agent, and it was also found that these two additives contribute to an increase of the polishing speed due to the physical action described below.

Based on these findings, the present invention was completed in which a plastic lens or the like is effectively polished by an aluminous abrasive powder and a polishing accelerator, preferably in combination with a sedimentation preventing agent.

More specifically, in accordance with the present invention, there is provided an abrasive composition comprising water, an aluminous abrasive, and at least one polishing accelerator selected from the group consisting of aluminum oxalate and aluminum lactate, optionally with at least one anti-settling agent selected from the group consisting of crystalline cellulose and colloidal alumina.

Furthermore, in accordance with the present invention, there is provided a process for polishing a plastic article, especially a plastic lens, in which the above-mentioned abrasive composition is used.

According to the present invention, the following effects can be attained.

(1) Aluminum oxalate and aluminum lactate have a chemical action on a plastic article and the chemical polishing effect is promoted.

(2) Crystalline cellulose and colloidal alumina increase the viscosity of the composition and are dispersed in the colloidal form in the composition to retain the aluminous abrasive, whereby sedimentation of the aluminous abrasive is effectively prevented. Furthermore, crystalline cellulose and colloidal alumina retain the aluminous abrasive in a good condition on a pad of the aluminous abrasive at the polishing step, and thus the mechanical polishing effect is enhanced.

DESCRIPTION OF THE PREFERRED EMBODIMENTS

The content of aluminum oxalate or aluminum lactate is preferably 0.5 to 10% by weight, more preferably 0.5 to 4% by weight, of the total weight of the abrasive composition in the present invention. If the content of aluminum oxalate $[Al_2(C_2O_4)_3; xH_2O]$ or aluminum lactate $[Al[CH_3CH(OH)COO]_3]$ is lower than 0.5% by weight (except water of crystallization; the same will apply hereinafter) of the composition, the required effect is not obtained, and if the content of aluminum oxalate or aluminum lactate is higher than 10% by weight, the effect is not further enhanced and the polishing efficiency or the surface precision is reduced.

In the present invention, the content of crystalline cellulose or colloidal alumina is 0.1 to 5% by weight, preferably 0.1 to 1% by weight, of the total weight of the abrasive composition. If the content of crystalline cellulose or colloidal alumina is lower than 0.1% by weight (except water of crystallization in the latter case; the same will apply hereinafter), the required effect is not obtained, and if the content of crystalline cellulose or colloidal alumina is higher than 5% by weight, the viscosity of the composition becomes too high, and therefore, a uniform dispersion of the aluminous abrasive is difficult and handling, such as a supply to a polishing machine, becomes cumbersome. Furthermore, in this case, an agglomeration of the aluminous abrasive often occurs.

Crystalline cellulose is a crystalline portion obtained by hydrolyzing a refined pulp having a high purity with a mineral acid, and removing an amorphous portion by washing and pulverizing, refining and drying the residual crystalline portion. This crystalline cellulose is in the form of a fine powder having a size on an order of a submicron. Crystalline cellulose is dispersed in the colloidal form in the composition and increases the viscosity.

Colloidal alumina is alumina hydrate ($Al_2O_3;nH_2O$, n =1 to 2.0) of boehmite or pseudoboehmite in the form of a fine powder having a size on an order of a submicron. Colloidal alumina is dispersed in the colloidal form in an acidic region to increase the viscosity.

In the present invention, since crystalline cellulose or colloidal alumina increases the viscosity and retains the aluminous abrasive while dispersed in the colloidal form, sedimentation of the aluminous abrasive is effectively prevented. Furthermore, since the aluminous abrasive is retained on a pad in a good state at the polishing step by crystalline cellulose or colloidal alumina, the polishing action is enhanced.

The content of the aluminous abrasive powder is 5 to 25% by weight, preferably 15 to 20% by weight of the total weight, of the abrasive composition in the present invention. If the content of the aluminous abrasive powder is lower than 5% by weight, the polishing efficiency is reduced and the surface precision is lowered. If the content of the aluminous abrasive powder exceeds 25% by weight, the polishing efficiency is not particularly enhanced but the viscosity becomes too high and the operation adaptability is degraded. In the present invention, the maximum particle size is 15 um or less and the average particle size is 5 um or less in the aluminous abrasive powder. If the maximum particle size exceeds 15 um and the average particle size exceeds 5 um in the aluminous abrasive powder, the surface roughness becomes large and scratching after appears. In view of the polishing efficiency and the surface roughness, preferably the particle size of the aluminous abrasive powder is 1 to 3 um.

The present invention will now be described in detail with reference to the following examples.

In these examples, the polishing characteristics were determined by the following polishing test.

An Udagawa type lens polishing machine (polishing plate diameter =120 mm) was used for the polishing operation, a suede type pad (CIEGAL 7355 supplied by Chiyoda K.K.) was bonded to the polishing plate, and a plastic lens having a diameter of 70 mm (CR-39 supplied by PPG Co., U.S.A., diethylene glycol bisacryl carbonate) was polished for 20 minutes.

In practice, the polishing composition of the present invention is used for mirror-finishing, for example, the polished surface of a satin-finished plastic lens formed by a rough polishing with a silicon carbide smoothing pad of about #600 and fine polishing with a white aluminum oxide smoothing pad of about #1200. In the present test, however, to make a comparison under the same conditions, mirror surface plastic lenses finished under defined conditions were used. The polishing conditions were a processing pressure of 275 $g/cm^2$, a lower plate rotation number of 400 rpm, a tommy bar reciprocation number of 70, a tommy bar amplitude of 36 mm, and a slurry feed rate of 100 ml/min. After the polishing operation, the weight of the plastic lens was measured, and the polishing speed was determined from the calculated weight loss. The surface roughness was measured by Talystep and Talydata 2000 supplied by Rank Taylor Hobson Company. The surface was observed by a differential interference microscope and under 100,000-lux spot light, and the presence or absence of scratches or orange peel on the polished surface was determined.

COMPARATIVE EXAMPLE 1

A slurry containing 20% by weight of an alumina powder (a-$Al_2O_3$) having a maximum particle size of 6.4 um and an average particle size of 1.9 um was diluted with pure water to form a slurry containing only 15% by weight of the alumina abrasive. The polishing test of a plastic lens (CR-39) was carried out by using this slurry, and the results are shown in Table 1.

EXAMPLES 1 through 5

A predetermined amount of aluminum oxalate was added to the slurry containing 20% by weight of the alumina abrasive, prepared in Comparative Example 1, and the slurry was diluted with pure water to obtain an abrasive composition of the present invention comprising 15% by weight of the alumina adhesive and 0.5 1.0, 2.0, 4.0 or 8.0% of aluminum oxalate. The polishing test of a plastic lens (CR-39) was carried out by using the obtained abrasive composition, and the test results are shown in Table 1.

EXAMPLES 6 through 10

An abrasive composition of the present invention comprising 15% by weight of the alumina abrasive and 0.5, 1.0, 2.0, 4.0 or 8.0% by weight of aluminum lactate was prepared in the same manner as described in Examples 1 through 5 except that aluminum lactate was used instead of aluminum oxalate. The polishing test of a plastic lens (CR-39) was carried out by using the obtained abrasive composition, and the results are shown in Table 1.

COMPARATIVE EXAMPLES 2

A predetermined amount of aluminum nitrate [Al($NO_3)_3$ ;$9H_2O$]was added to the slurry containing 20% by weight of the alumina abrasive, prepared in Comparative Example 1, and the slurry was diluted with pure water to obtain a comparative conventional abrasive composition containing 15% by weight of the alumina abrasive and 4% by weight of aluminum nitrate. The polishing test of a plastic lens (CR-39) was carried out by using this abrasive composition, and the results are shown in Table 1.

TABLE 1

| | Polishing Accelerator (% by weight) | pH | Polishing Rate (mg/20 minutes) | Surface Roughness (Å) | Surface Defects |
|---|---|---|---|---|---|
| Products of present invention | | | | | |
| Example 1 | aluminum oxalate, 0.5 | 3.9 | 225 | 256 | not observed |
| Example 2 | aluminum oxalate, 1.0 | 3.8 | 230 | 258 | not observed |
| Example 3 | aluminum oxalate, 2.0 | 3.6 | 232 | 255 | not observed |
| Example 4 | aluminum oxalate, 4.0 | 3.3 | 242 | 256 | not observed |
| Example 5 | aluminum oxalate, 8.0 | 2.8 | 240 | 255 | not observed |
| Example 6 | aluminum lactate, 0.5 | 3.9 | 224 | 263 | not observed |
| Example 7 | aluminum lactate, 1.0 | 3.8 | 230 | 260 | not observed |
| Example 8 | aluminum lactate, 2.0 | 3.6 | 236 | 253 | not observed |
| Example 9 | aluminum lactate, 4.0 | 3.4 | 239 | 252 | not observed |
| Example 10 | aluminum lactate, 8.0 | 3.3 | 237 | 254 | not observed |
| Comparative Example 1 Conventional product | — | 9.5 | 134 | 390 | not observed |
| Comparative Example 2 | aluminum nitrate, 4.0 | 3.1 | 224 | 279 | not observed |

From the results shown in Table 1, it is seen that the abrasive composition comprising aluminum oxalate or aluminum lactate has a higher polishing rate and a smaller surface roughness than those of the conventional abrasive composition comprising aluminum nitrate.

EXAMPLES 11 through 14

Crystalline cellulose ("Avicel" supplied by Asahi Kasei K.K.) was added to the abrasive composition comprising 15% by weight of the alumina abrasive and 4% by weight of aluminum oxalate, obtained in Example 4, so that the content of the crystalline cellulose in the composition was 0.1, 0.25, 0.5 or 1.0% by weight, and the composition was thoroughly stirred obtain an abrasive composition of the present invention.

The polishing test of a plastic lens (CR-39) was carried out by using the obtained abrasive composition, and the results are shown in Table 2.

EXAMPLES 15 through 18

An abrasive composition of the present invention comprising 0.1, 0.25, 0.5 or 1.0% by weight of colloidal alumina was prepared in the same manner as described in Examples 11 through 14 except that colloidal alumina (pseudoboehmite; $Al_2O_3 \cdot 1.5H_2O$) was used instead of crystalline cellulose. The polishing test of a plastic lens (CR-39) was carried out by using the obtained abrasive composition, and the results are shown in Table 2.

TABLE 2

| | Polishing Accelerator (% by weight) | Sedimentation-Preventing Agent (% by weight) | pH | Polishing Rate (mg/20 minutes) | Surface Roughness (Å) | Surface Defects |
|---|---|---|---|---|---|---|
| Product of present invention | | | | | | |
| Example 4 | aluminum oxalate, 4.0 | — | 3.3 | 242 | 256 | not observed |
| Example 11 | " | crystalline cellulose, 0.1 | 3.3 | 271 | 228 | not observed |
| Example 12 | " | crystalline cellulose, 0.25 | 3.3 | 282 | 225 | not observed |
| Example 13 | " | crystalline cellulose, 0.5 | 3.3 | 295 | 226 | not observed |
| Example 14 | " | crystalline cellulose, 1.0 | 3.3 | 300 | 225 | not observed |
| Example 15 | " | colloidal alumina, 0.1 | 3.3 | 278 | 233 | not observed |
| Example 16 | " | colloidal alumina, 0.25 | 3.3 | 288 | 230 | not observed |
| Example 17 | " | colloidal alumina, 0.5 | 3.3 | 302 | 223 | not observed |
| Example 18 | " | colloidal alumina, 1.0 | 3.3 | 307 | 222 | not |

TABLE 2-continued

| Polishing Accelerator (% by weight) | Sedimentation-Preventing Agent (% by weight) | pH | Polishing Rate (mg/20 minutes) | Surface Roughness (Å) | Surface Defects |
|---|---|---|---|---|---|
| | | | | | observed |

From the results shown in Table 2, it is seen that the abrasive composition comprising crystalline cellulose or colloidal alumina has an improved polishing rate and surface roughness compared to the abrasive composition free of crystalline cellulose or colloidal alumina. Furthermore, in the abrasive composition comprising crystalline cellulose or colloidal alumina, the sedimentation speed of the alumina abrasive is lower than in the abrasive composition free of crystalline cellulose or colloidal alumina, and even if precipitates are formed, the precipitates are easily dispersed by stirring. Accordingly, the abrasive composition of the present invention has an excellent storage stability and operation adaptability. Namely, after 1 month's storage, the precipitates can be easily dispersed by stirring in the composition comprising crystalline cellulose or colloidal alumina, but the precipitates in the comparative examples coagulates as a solid and are not easily dispersed by stirring.

As apparent from the foregoing description, the abrasion composition of the present invention comprising aluminum oxalate or aluminum lactate as the polishing accelerator is improved when compared with the conventional abrasive composition comprising aluminum nitrate as the polishing accelerator, in the following points with respect to the processing efficiency and finished surface precision:
(a) The polishing rate is high.
(b) The surface roughness is small.

Furthermore, if a sedimentation preventing agent such as crystalline cellulose or colloidal alumina is added to the abrasive composition of the present invention, the following effects concerning the storage stability and operation adaptability can be obtained in addition to the above-mentioned effects concerning the processing efficiency and finished surface precision:
(c) The polishing rate is further increased.
(d) The surface roughness is further reduced.
(e) The speed of the sedimentation of the alumina abrasive is lowered.
(f) The formed precipitate of the alumina abrasive is soft and can be easily dispersed, and therefore, the abrasive composition can be stored for a long time.
(g) Even if the abrasive composition is recycled and used repeatedly, an excellent and stable polishing performance can be obtained.

Accordingly, excellent effects are obtained when the abrasive composition of the present invention is used in practice.

We claim:

1. An abrasive composition comprising water, an aluminous abrasive and at least one polishing accelerator selected from the group consisting of aluminum oxalate and aluminum lactate.

2. An abrasive composition as set forth in claim 1, which further comprises at least one sedimentation preventing agent selected from the group of consisting of crystalline cellulose and colloidal alumina.

3. An abrasive composition as set forth in claim 1, wherein the aluminous abrasive has a maximum particle size of 15 μm or less and an average particle size of 5 μm or less and is present in an amount of 5 to 25% by weight based on the total composition.

4. An abrasive composition as set forth in claim 1, wherein the polishing accelerator is present in an amount of 0.5 to 10% by weight based on the total composition, and the pH value of the composition is from 2 to 4.

5. An abrasive composition as set forth in claim 2, wherein the sedimentation preventing agent is present in an amount of 0.1 to 5% by weight based on the total composition.

6. A process for polishing a plastic article with an abrasive composition, comprising polishing the plastic article with an abrasive composition comprising water, an aluminous abrasive and at least one polishing accelerator selected from the group consisting of aluminum oxalate and aluminum lactate.

7. A process according to claim 6, wherein the plastic article is a lens.

8. A process according to claim 6, wherein the abrasive composition further comprises at least one sedimentation preventing agent selected from the group consisting of crystalline cellulose and colloidal alumina.

9. A process according to claim 6, wherein the aluminous abrasive has a maximum particle size of 15 um or less and an average particle size of 5 um or less and is present in an amount of 5 to 25% by weight based on the total composition.

10. A process according to claim 6, wherein the polishing accelerator is present in an amount of 0.5 to 10% by weight based on the total composition and the pH value of the composition is from 2 to 4.

11. A process according to claim 8, wherein the sedimentation-preventing agent is present in an amount of 0.1 to 5% by weight based on the total composition.

* * * * *